United States Patent
Sperberg

[11] 3,877,496
[45] Apr. 15, 1975

[54] PNEUMATIC TIRE INFLATING AGENTS

[76] Inventor: Lawrence R. Sperberg, 6740 Fiesta Dr., El Paso, Tex. 79912

[22] Filed: June 26, 1973

[21] Appl. No.: 373,643

Related U.S. Application Data

[63] Continuation of Ser. No. 253,904, May 16, 1972, abandoned, which is a continuation of Ser. No. 104,639, Jan. 7, 1971, abandoned, which is a continuation-in-part of Ser. No. 814,233, April 4, 1969, Pat. No. 3,554,027, which is a continuation of Ser. No. 601,275, Nov. 21, 1966, abandoned.

[52] U.S. Cl. .................................................. 141/4
[51] Int. Cl. ............................................ B65b 31/00
[58] Field of Search .......... 73/8, 146, 432 R; 141/1, 141/2, 4, 5, 7, 8, 9, 38, 59, 65, 66; 152/330; 423/219, 245, 248

[56] References Cited
UNITED STATES PATENTS

| | | | |
|---|---|---|---|
| 3,468,348 | 9/1969 | Spereberg | 141/4 X |
| 3,498,341 | 3/1970 | Spereberg | 141/4 |
| 3,554,027 | 1/1971 | Spereberg | 73/146 |

FOREIGN PATENTS OR APPLICATIONS

| | | | |
|---|---|---|---|
| 955,081 | 11/1947 | France | 152/330 |

Primary Examiner—Houston S. Bell, Jr.
Assistant Examiner—Frederick R. Schmidt
Attorney, Agent, or Firm—Marcus L. Bates

[57] ABSTRACT

An inflating agent for inflating the gas containing chamber of a pneumatic tire. The agent is comprised of helium, hydrogen, or a mixture of helium and hydrogen together with either air, nitrogen, or flue gases.

11 Claims, 8 Drawing Figures

INVENTOR
LAWRENCE R. SPERBERG
BY
MARCUS L. BATES
HIS AGENT

PNEUMATIC TIRE INFLATING AGENTS

This application is a continuation of application Ser. No. 253,904 filed May 16, 1972, now abandoned; which was a continuation of Ser. No. 104,639 filed Jan. 7, 1971, now abandoned; which was a continuation in part of Ser. No. 814,233 filed Apr. 4, 1969 now U.S. Pat. No. 3,554,027, which was a continuation of U.S. Pat. application Ser. No. 601,275 filed Nov. 21, 1966, now abandoned.

BACKGROUND OF THE INVENTION

A tire commences deterioration at the moment it is removed from the vulcanization mold, and continues to deteriorate until it is considered unsafe by its owner, whereupon it is discarded and its function as a pneumatic tire ceases. The rate of deterioration of a tire can be controlled while the tire is in storage since it can be provided with a protective wrapper and excluded from sun light; but, once the tire is installed upon a vehicle, the rate of deterioration is usually ignored.

Tire deterioration is caused by both chemical and mechanical phenomenon. The mechanical phenomenon which accelerates deterioration of a tire can be attributed to physical fatigue, which is all of the stresses, strains, distortions, and other detrimental physical phenomena which the tire must endure or be subjected to during its useful life. Chemical fatigue in pneumatic tires is primarily an oxidation phenomenon. Both physical fatigue and chemical fatigue are greatly aggravated by heat build-up formed throughout the mass of the tire in proportion to the temperature levels generated therein.

The heat generated within a rotating tire is dissipated by both conductivity and convection. The rate of heat dissipation from the tire is proportional to the temperature differential, thermal conductivity, and the physical dimensions of the tire mass. In a running tire, heat is generated as the engine delivers power from the steel wheel, through the flexible tire, and to the ground supporting surface so as to propel the vehicle along the surface of the ground. The greater the power which the tire is required to transmit from the rim to the ground, the greater is the amount of mechanical energy which is converted to heat energy within the tire because of the inherent hysteretic losses associated with transmitting power through the cord body and through the rubber compound that insulates the individual cords from one another and from the ground.

The heat formed within the tire is carried away externally by the air flowing past the outside peripheral surface area of the tire. Part of the heat passing to the interior surface of the tire is carried away by convection as the gaseous inflating agent within the tire transfers the heat from the inside peripheral wall surface of the pneumatic tire into the steel rim. The remainder of the heat appearing on the inside surface of the gas chamber of the tire is transferred to the cooler area of the tire, as for example, into the spaced apart beads and directly into the steel rim by conduction.

It is desirable to maintain the mass of an operating tire at reduced equilibrium temperatures so as to minimize both physical and chemical fatigue of all the elements which constitute a pneumatic tire. It is also desirable to reduce chemical fatigue of a tire by excluding oxygen from the inflation media which is contained within the inflation chamber of the tire. It is further desirable to maintain the interior of the tire mass at a reduced temperature by increasing the rate of heat transfer from the interior of the tire mass to areas of lower temperature. Furthermore, it is desirable to exclude permeation of the elements of a tire with oxygen and at the same time to promote selective permeation of the tire with advantageous gas molecules that have a faculty for increasing thermal conductivity.

SUMMARY OF THE INVENTION

The present invention broadly relates to a method of improving the life of a pneumatic tire. More specifically the invention relates to a method of maintaining the tire mass at a lower temperature, and by reducing the oxidation reaction of the elements of the tire should oxygen be present. Still more specifically the invention is related to inflating a tire with a gaseous inflating agent which includes either helium or hydrogen, individually or admixed with a diluent. The invention futher comprehends reducing tire fatigue by inflating the chamber of a tire with helium or hydrogen either alone or together with one or more of the following gases: air, nitrogen, carbon dioxide, flue gases, or other non-oxidizing gaseous inflating agents which are compatible with the elements of a tire.

A primary object of this invention is to cause the heat generated within a tire mass to be removed therefrom in an improved manner.

Another object of this invention is to improve the rate at which heat is removed from the mass of a pneumatic tire.

Still another object of this invention is to reduce the temperature level of the elements of a tire while at the same time utilizing the means by which the foregoing is accomplished so as to reduce the rate of chemical oxidation reaction within the tire.

A further object of this invention is to reduce the rate of deterioration of the elements of the tire by improving the rate of heat transfer from the tire mass to areas of lower temperature, thereby reducing the rate of physical fatigue of the tire.

A still further object of the present invention is to improve the durability of a pneumatic tire by reducing the rate of deterioration of the tire.

A still further object of this invention is to improve the resistance to abrasive wear of a tire tread by reducing the effect that mechanical fatigue oridinarily produces in a tire.

As used throughout this disclosure, the term "wear" or "wear susceptibility" is a measure of the ability of the tread rubber compound to withstand abrasive wear. "Tire durability" is a measure of tire life in hours or miles driven before failure of the tire. "Durable life" encompasses both durability and wear susceptibility, and therefore is a measure of the length of time which the tire can be used until it is rendered worthless. "Structural failure" of a tire relates to the tire reaching a condition which renders the tire worthless.

The above objects are attained in accordance with the present invention by the provision of a gaseous inflating agent which improves the rate of heat transfer from the tire mass.

These and other objects and advantages of this invention will become readily apparent to those skilled in the art upon reading the following detailed description and by referring to the accompanying drawing.

DESCRIPTION OF THE PREFERRED EMBODIMENTS

Figure 1:
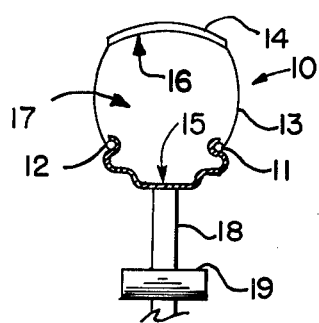
FIG. 1 shows an ordinary pneumatic tire mounted upon a steel rim.

In FIG. 1 there is seen a pneumatic tire, generally illustrated by the arrow at numeral 10, having the usual spaced apart beads 11, 12 connected to one or more plies 13 which support a tread wearing compound having a tread surface 14, with the tread surface being circumferentially disposed about the outer periphery of the tire in the usual manner. The inside peripheral wall surface of an ordinary steel rim 15 together with the inside peripheral wall surface of the tire 16 form the gaseous inflating chamber 17. The tire may have a tube included therein, if desired. The steel rim is attached at 18 to a hub 19. The hub is journaled to a vehicle in the usual manner. The tire and rim can take on any number of forms and are schematically illustrated herein for purposes of discussion only.

Figure 2:
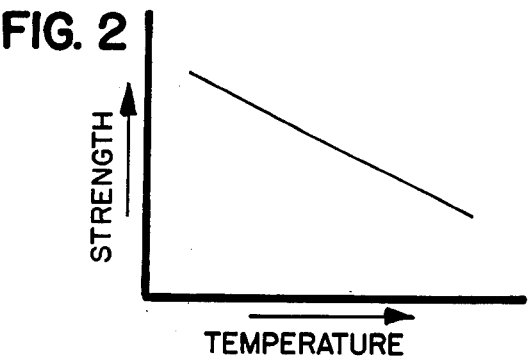
FIG. 2 sets forth a plot having a curve thereon which illustrates the influence of temperature upon the strength of materials.

In FIG. 2 there is disclosed a curve which generally illustrates the relationship between tensile strength of tire cord material and the temperature at which the the determination was made. As seen in the drawings, the strength decreases as the temperature rises. This phenomenon is ture for all organically based textile cord material as well as for the elastomer composition generally used in tire manufacturing. Accordingly, as the temperature within the tire body rises, the tensile strength of the tire body elements is lowered a proportionate amount.

Figure 3:
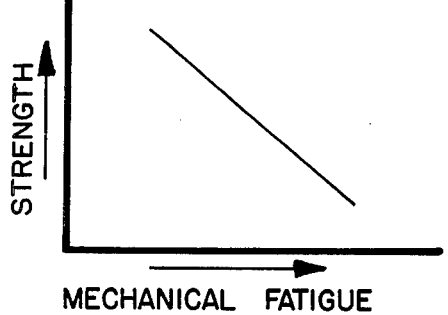
FIG. 3 sets forth a plot having a curve thereon illustrating the influence of mechanical fatigue upon strength of materials.

In FIG. 3 there is seen a curve generally illustrating the effect of accumulated mechanical fatigue upon the strength of the materials from which a tire is usually fabricated. As the tire is repeatedly worked by being driven on a vehicle, its strength is progressively lowered as a consequence of the lowering in strength of the rubber compositions comprising the bulk of the mass of the tire.

Figure 4:
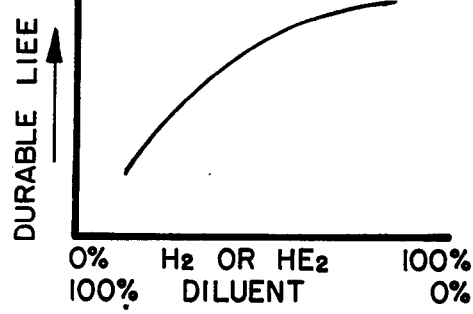
FIG. 4 is a plot having a curve showing varying proportions of hydrogen or helium together which a diluent, and the effect upon durable life when the gas is used as the inflation agent in a pneumatic tire.

In FIG. 4 there is graphically illustrated the change in durable life as a result of inflating the gas chamber of a pneumatic tire with varying concentrations of hydrogen or helium, each or both of which is admixed with the recited diluents. As seen illustrated by the disclosed curve, ordinary inflating agents cuase the tire to realize a low durable life as compared to utilizing increasing percentage compositions of either hydrogen or helium. The durable life continues to increase to a maximum in proportion to the concentration of the helium or hydrogen.

Figure 5:
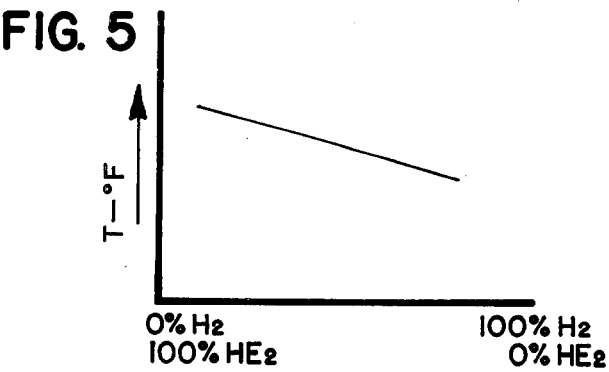
FIG. 5 sets forth a graph showing varying proportions of hydrogen and helium admixed together and the effect of this mixture upon the temperature of the body of a pneumatic tire when the mixture is used as the inflating agent.

In FIG. 5 there is seen a curve or graph which illustrates in a general manner the temperature elevation as measured within the gas chamber of a rolling tire with respect to the resulting effect of using different compositions of an inflating agent therein. The inflating agent is comprised of a mixture of hydrogen and helium with varying proportions of each of these components between the limits of "0" and 100% being used so as to provide a 100% mixture of the two gases.

Figure 6:
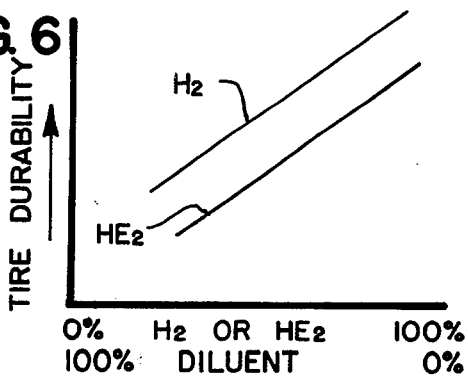
FIG. 6 shows the effect of helium or hydrogen upon tire durability when admixed with a diluent and placed within the inflating chamber of a pneumatic tire.

In FIG. 6 there is generally illustrated in graphic form the influence of inflating agent upon tire durability wherein the inflating agent is comprised of a diluent admixed with various percentage composition of helium or hydrogen, with one curve broadly illustrating the use of a mixture of helium and a diluent while the remaining cruve broadly sets forth the use of a mixture of hydrogen and a diluent.

As the percentage composition of either hydrogen or helium is increased, there is a corresponding increase in the tire durability. It will be noted that hydrogen is superior to helium so far as regards tire durability.

Figure 7:
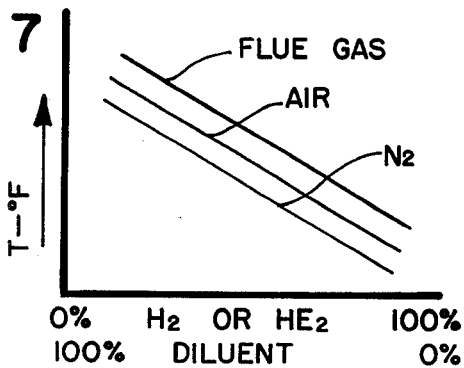
FIG. 7 shows the effect of helium or hydrogen admixed with varying proportions of a diluent upon the temperature of the gas within the chamber of a pneumatic tire.

In FIG. 7 there is set forth three different curves which generally show the trend of change in tire body temperature occasioned by using varying percentage composition of helium or hydrogen when the latter is admixed with a diluent. The diluent is comprised of air, flue gases, or nitrogen, for example.

The upper curve indicates that increasing the percentage composition of helium or hydrogen beings about a corresponding decrease in the tire body temperatures. The second curve, noted as "air," shows a similar but slightly less effect upon temperature as compared to the use of flue gases as the diluent. The lowermost curve indicates that the diluent nitrogen, when admixed with either hydrogen or helium, provides a tire in which the temperature of the body is slightly lower than when either air or flue gases are used as a diluent. The temperature differential exhibited between the use of flue gases, air, and nitrogen are small and difficult to measure under ordinary conditions of usage. However, these differences are magnified with a gross differential in severity of use. Moreover, the influence exhibited by the addition of either hydrogen or helium to the diluent is more readily discernible under more moderate conditions of usage.

Stated differently, it is difficult to measure real differences between the use of air, flue gases, or nitrogen; or between the use of hydrogen as compared to helium; but, there is a more pronounced temperature differential noted between the diluent and either hydrogen or helium. Accordingly, increasing percentages of either hydrogen or helium in the inflating medium lowers the operating temperature of the tire a greater amount than does the diluent when it is used alone as the inflating agent.

Figure 8:
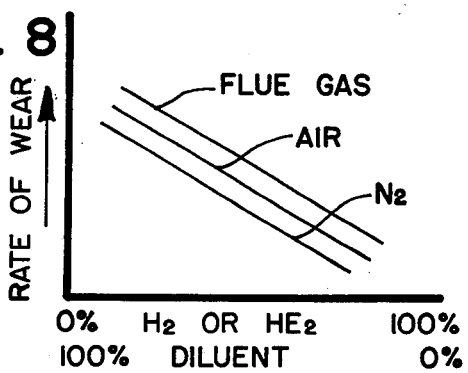
FIG. 8 shows the relationship between rate of wear with respect to a mixture of hydrogen or helium with varying proportions of a diluent when the mixture is placed in the gas chamber of a pneumatic tire.

The three curves of FIG. 8 broadly illustrate the rate of wear of a tread wearing composition of a pneumatic tire with respect to the inflating agent, wherein the inflating agent is a mixture of helium or hydrogen together with a diluent. The diluent is comprised of air, flue gases, or nitrogen, as indicated by the curves.

The change in rate of wear becomes more pronounced relative to the increase in the severity of use to which the tire is subjected. In truck tires, for example, the greater mass of the tire construction causes more heat to be generated within the tire mass and therefore exhibit greater differences in wear rates as compared to passenger tires, relative to different percentage compositions of the inflating agent. Accordingly, in truck tires where severity is the greatest, the advantages of using hydrogen or helium as the inflating medium is more evident. Therefore, any service application that results in higher operating temperatures of pneumatic tires will respond more favorably to the teachings of this invention.

While the above illustrations broadly set forth the effect of using various percentage compositions of hydrogen and helium with respect to the temperature level within the mass of pneumatic tire, or with respect to wear rates of a tire, the following specific examples will more precisely enable those skilled in the art to comprehend and practice various aspects of the invention: (refer to chart on page 10).

In the chart on page 10, the temperature differentials and wear rates were found to generally follow the trends set forth in FIGS. 2–8. The tire durability was established by physical inspection at the conclusion of a fixed mileage specified test. The examples included tubular and tubless passenger tires, and were repeated in some instances for truck tires with the same conclusions being reached. The failure incidence of many of the above examples were exemplified in the truck tire test.

In the chart on page 10, Example 1 was carried out by evacuating a tubeless type tire and refilling the tire to the recommended inflation pressure with 100% helium. The helium was purchased in a 213 c.f. bottle. The tire of Example 1 was mounted on a vehicle with the tires of Examples 2, 3, and 4 and the vehicle was operated a sufficient amount of time to develope the recited data.

The tires were measured and rotated each 575 miles so as to avoid the effects of drive axle, free wheeling, turbulence, and other experimental areas known to those skilled in the art of testing pneumatic tires.

In each of the examples set forth herein, the tires were first measured for their non-uniformity for reasons best appreciated after digesting my previously issued application Ser. No. 847,778, now U.S. Pat. No. 3,563,088.

CHART

| | Percent composition of inflating agent: | | | | |
| --- | --- | --- | --- | --- | --- |
| | Helium | Hydrogen | Air | Nitrogen | Flue Gas |
| No. 1 | 100 | 0 | 0 | 0 | 0 |
| No. 2 | 0 | 100 | 0 | 0 | 0 |
| No. 3 | 0 | 0 | 100 | 78 | 0 |
| No. 4 | 0 | 0 | 0 | 100 | 0 |
| No. 5 | 0 | 0 | 0 | 0 | 100 |
| No. 6 | 80 | 20 | 0 | 0 | 0 |
| No. 7 | 80 | 0 | 20 | 0 | 0 |
| No. 8 | 80 | 0 | 0 | 20 | 0 |
| No. 9 | 80 | 0 | 0 | 0 | 20 |
| No. 10 | 60 | 40 | 0 | 0 | 0 |
| No. 11 | 60 | 0 | 40 | 0 | 0 |
| No. 12 | 60 | 0 | 0 | 40 | 0 |
| No. 13 | 60 | 0 | 0 | 0 | 40 |
| No. 14 | 40 | 60 | 0 | 0 | 0 |
| No. 15 | 40 | 0 | 60 | 0 | 0 |
| No. 16 | 40 | 0 | 0 | 60 | 0 |
| No. 17 | 40 | 0 | 0 | 0 | 60 |
| No. 18 | 20 | 80 | 0 | 0 | 0 |
| No. 19 | 20 | 0 | 80 | 0 | 0 |
| No. 20 | 20 | 0 | 0 | 80 | 0 |
| No. 21 | 20 | 0 | 0 | 0 | 80 |
| No. 22 | 30 | 30 | 40 | 0 | 0 |
| No. 23 | 30 | 30 | 0 | 40 | 0 |
| No. 24 | 30 | 30 | 0 | 0 | 40 |
| No. 25 | 30 | 30 | 0 | 0 | 0 | 40% methane |
| No. 26 | 20 | 20 | 0 | 30 | 0 | 30% methane |

In Example 2, the tire was inflated with commercially available hydrogen having a purity of 99.9%. The tire was prepared for hydrogen inflation in the same manner as set forth in conjunction with Example 1 above.

In Example 3, ordinary air was used as the inflating medium and this tire was used as a control with respect to the remaining tires of the test. The percentage composition of nitrogen is naturally 78% since this is the normal percentage composition of nitrogen contained within air.

In Example 4, the pure nitrogen inflation agent was attained by using a hydrazine compound in the manner as taught in my previously filed application Ser. No. 676,076, now U.S. Pat. No. 3,650,143.

Example 5 was carried out by combusting together butane and air so as to obtain a mixture of carbon dioxide and nitrogen, after which the excess oxygen was removed by running the hot gases over powdered iron. The gases were next dried by running the effluent through a metal tube containing crystals of silica gel. For further reference to this subject, attention is directed to my previously filed application Ser. No. 601,451, now U.S. Pat. No. 3,498,343.

Examples 7, 9, 11, 12, 13, 16, and 20 were carried out by first evacuating the tire, followed by inflation with helium or hydrogen to a first pressure, after which the tire was further inflated with the specified diluent.

For example, number 12 tire was inflated with helium to a pressure of 15 psig, after which commercially available nitrogen was used to inflate the tire to a pressure of 30 psig. The resultant compositions of helium and nitrogen were therefore attained by computation.

In Example 8, a metallic dust, particularly iron dust and water, was used as an oxygen scavenger in order to remove oxygen from the fill gas. This required inflating the tire to a pressure beyond or in excess of the desired final inflation pressure, all in accordance with previously filed application Ser. No. 665,607, now U.S. Pat. No. 3,515,181.

It is pointed out that the inert atmosphere can be obtained from using any metal dust selected from the following group: iron and zinc. Moisture can be included, if desired, to enhance the reaction between the metal and the oxygen.

In Example 22, the tire was inflated with air after which the hydrogen component of the inflating agent was added to the gas chamber.

REMARKS

In a rotating tire such as seen in FIG. 1, heat buildup within the tire and wheel assembly is proportional to the rate at which the heat is dissipated therefrom. Heat is removed from the tire mass by both convection and conduction, with convection occurring in the gas chamber 17 as the gaseous inflating agent transfers heat from the inside peripheral wall surface of the tire to the inside peripheral wall surface of the steel rim. Convection also removes heat from the exterior of both the tire and the wheel. Heat is conducted through the tire mass and into the metal rim at the interface formed between the rim and the tire beads, as well as being conducted to the inner and outer peripheral wall surfaces of the tire.

The rate of heat transfer from within chamber 17, that is, the rate at which the gaseous inflating agent transfers heat from the inside peripheral wall of the tire to the inside peripheral wall of the steel rim, is a function of the ability of the inflating medium to remove heat from the inside wall of the tire and to deposit this adsorbed heat on the inside surface of the steel rim as the inflating agent follows a particular circulation pattern within the chamber.

As seen in the above figures, hydrogen maintains the tire mass at a slightly lower temperature than helium, while helium provides a substantially cooler running tire than nitrogen, and nitrogen provides a slightly cooler running tire than does air which in turn is very slightly cooler running than flue gas.

It is noted, however, that the hydrogen, helium, or a mixture of the hydrogen and helium with a diluent reduces the wear rate an amount which is not commensurate with the slightly lowered tire temperature occasioned merely by the presence of the above inflating mediums. Therefore, the presence of helium or hydrogen, with or without the diluent, causes an unexpected major wear advantage which is greater than would be expected from the observed lowered temperatures of the gas chamber. Therefore this wear advantage is not explainable on the basis of the operating temperature differentials alone.

It is postulated that the helium or hydrogen molecules permeate into the tire mass where the heat transfer coefficient of the entire body is changed to a larger value. This is a reasonable hypothesis because hydrogen and helium are the smallest known molecules, and accordingly, it is possible that these molecules, when used as the fill gas, continually migrate in an outward direction due to the pressure differential or driving force imposed across the tire carcass, that is, the inflation pressure. That this driving force does slowly force the fill gas through the tire elements is evidenced by a loss of inflation pressure over a period of time.

For example, it has been noted that both helium and hydrogen resemble air in the reduction in inflation pressure over a period of time whereas nitrogen inflated tires suffer a slower loss in inflation pressure.

Accordingly, it is submitted that the inflation of tires with varying proportions of helium, hydrogen, or a helium and hydrogen mixture together, with or without a diluent, elongates tire durability by different mechanisms.

One mechanism results from improved heat transfer because of the presence of helium or hydrogen in the gas chamber, that is, the conductive aspect of heat transfer through a gaseous phase.

Another mechanism results from improved conduction of heat from the tire mass to areas of lower temperature through a solid phase and to the outer periphery of the tire due to the permeation of the fill gas into the tire mass wherein the various elements of the tire are filled or saturated with the helium or hydrogen, by direct solution or by excluding minute voids within the tie body, thereby increasing the rate of heat transfer therethrough.

Either of the above phenomenon brings about still another unexpected advantage in that any oxygen which would otherwise be present within the tire body if "flushed" or replaced by the inflation medium due to the continual but minute flow of hydrogen or helium therethrough.

While it may appear that the use of hydrogen (with or without a diluent) presents an explosive hazard, tests indicate that in actuality, hydrogen is a safe inflating agent, and, similar to the dangers associated with the presence of gasoline carried in a partially filled fuel tank of the vehicle, so long as the hydrogen is contained within the tire, there is no danger of an explosion. It is probably correct to assume that hydrogen contained within the gas chamber of a tire is safer than the fuel contained in tank of the vehicle.

The inflammable limits of hydrogen and air mixtures, under one atmosphere of pressure, is 4.1 – 74% hydrogen admixed with air. The ignition temperature of such a mixture of hydrogen is 1076° F. in either air or oxygen. Hence such an operating temperature will never be realized under any condition of tire operation.

In testing tires which were inflated with hydrogen admixed with various diluents, as well as pure hydrogen contained in the gaseous inflating chamber, it has been found that there is no danger of an explosion from ignition of the hydrogen of the hydrogen in the event of a flat caused by a blow-out or a leaking tire. Furthermore, in a tire inflates with a mixture of hydrogen and air, wherein there is sufficient oxygen included therein to fall within the limits of inflammability, there can be no explosion within the gas chamber because generation of static electricity cannot bring about a spark discharge for the reason that there is no point-to-point contact to provide the necessary difference in potential to initiate spark discharge. Accordingly, the generated current is carried off the tire externally of the gas chamber.

It is conceivable that a hydrogen inflated tire could be repeatedly repressured with air until an explosive mixtue is realized within the chamber; however, as pointed out above, this mixture is considered to be no more dangerous than the fuel contained within the fuel tank of the car. On the other hand, a tire inflated with air could conceivably be repressured by using hydrogen to thereby attain an explosive mixture, and such a mixture would not be considered dangerous for the reason that there is no means by which the mixture could be detonated.

In a tire mounted on a wheel, wherein the rim was provided with means for controllably producing a spark within the gas chamber, and with the gas chamber thereof containing one atmosphere of air; when hydrogen as used to inflate the tire to its operating pressure it was found that no explosion resulted when a high tensity spark was discharged within the gas chamber. However, in a tire inflated to 28 psig with air, and additionally inflated with hydrogen to 38 psig, the tire did explode upon a spark being discharged within the gas chamber. The explosion ruptured the tire in two different areas in a manner similar to a violene blow-out of a tire overinflated with air. Hence, even if fate should decree that a hydrogen inflated tire should somehow be ignited and explode, the resultant explosion will not be fatal to the occupants of the car, unless of course the loss of the tire caused loss of control of the vehicle, as is often realized with any sort of blow-out.

So long as a scavenger is placed within the gas chamber of the tire, the hydrogen inflated tire is absolutely safe because upon inadvertent repressurization with air, the oxygen will be rapidly removed from the gaseous state, so that an incombustible mixture is formed in the gas chamber.

Comparing abnormal leakage of pure hydrogen from a tire with the gaseous vapors normally vented from an automotive fuel tank on a hot day, indicates that the leaking hydrogen inflated tire is far less dangerous as compared to the hydrocarbon vapors normally flowing from the fuel tank vent.

A tire, when initially mounted on a rim or wheel, will ordinarily contain one atmosphere of air pressure within the inflation chamber thereof. Further inflation of the tire, using hydrogen, to a pressure of 2 psig, followed by discharging a spark within the tire chamer, results in combustion of the hydrogen and oxygen mixture; however, the combustion reaction is not of an explosive nature, and the resultant products of combustion contained within the chamber are at a pressure which is below atmospheric.

When the percentage composition of the hydrogen component of the above uncombusted mixture is progressively increased, the combustion reaction within the chamber becomes more pronounced, and at 15 psig hydrogen inflation, a light or mild explosion is experienced. The explosion is not sufficiently violent to damage the tire structure of a structurally sound tire, Moreover, where an excess of hydrogen beyond stoichiometric is present, the resultant products of combustion contain no oxygen.

A still further increase of the hydrogen component contained in the gaseous mixture of 22 psig provides a mixture which is combustible, but increasing the hydrogen concentration beyond this value appears to provide an incombustible mixture.

In each of the above examples, the tire body was not heated to a value which could damage the compounds thereof due to the combustion reaction. By mixing together various percentage compositions of hydrogen, oxygen, and inerts, a test procedure for evaluating tires is made possible wherein the explosive force is maintained at a particular level so as to subject a specific tire design to a predetermined explosive force which will be a destructive force only for a defective tire. This test is especially useful for separating the structurally sound used carcasses which are to be recapped from poor carcasses which are unsuitable for being retreaded.

I claim:

1. Method of improving the durable life of a pneumatic tire for use on an earth bound vehicle comprising the steps of:

mounting the pneumatic tire on a wheel, adding to the tire chamber of the pneumatic tire a gaseous inflating agent; said agent being a mixture of at least two different gases, one gas being selected from a first group of gaseous compounds, and the secong gas being selected from a second group of gaseous compounds;

said first group consisting essentially of hydrogen and helium:

said second group consisting essentially of nitrogen, carbon dioxide, flue gases, and air.

2. The method of claim 1 wherein the gas selected from the first group is helium.

3. The method of claim 1 wherein the gas selected from the second group is air.

4. The method of claim 1 wherein the gas selected from the second group is flue gases.

5. The method of claim 1 wherein the gas selected from the second group is nitrogen.

6. The method of claim 1 wherein the gas selected from the first group is Helium and the gas selected from the second group is air.

7. The method of claim 1 wherein the gas selected from the first group is helium and the gas selected from the second group is flue gases.

8. The method of claim 1 wherein the gas selected from the first group is helium and the gas selected from the second group is nitrogen.

9. The method of claim 1 whrein the inflating agent is a mixture of gases comprised of more than 50% of the first group and less than 50% of the second group.

10. The method of claim 1 wherein the inflating agent is a mixture of gases comprised of less than 50% of the first group and more than 50% of the second group.

11. Method of improving the durable life of a pneumatic tire for use on an earth vehicle comprising: mounting the tire upon a wheel, removing any gaseous material from the tire chamber, and inflating the tire chamber of the pneumatic tire with a gaseous inflating agent, said agent consisting essentially of a gas selected from the group comprised of helium and hydrogen.

* * * * *